United States Patent Office 2,955,129
Patented Oct. 4, 1960

2,955,129

PREPARATION OF TERT.-ALKYLISO-THIOCYANATES

Richard C. Mansfield, Haddonfield, N.J., assignor to Rohm & Haas Company, Philadelphia, Pa., a corporation of Delaware No Drawing. Filed May 21, 1958, Ser. No. 736,666

15 Claims. (Cl. 260—454)

This invention concerns tert-alkylisothiocyanates and a method for their preparation.

Broadly stated, the object of this invention is to provide a new process for preparing t-alkylisothiocyanates having a wide molecular weight range and which are uncontaminated by thiocyanates.

A more specific object is to provide an improved method for preparing t-alkylisothiocyanates which gives yields that are commercially practicable.

Another object is to provide t-alkylisothiocyanates of a much higher molecular weight than have heretofore been obtained.

The prior art has known of t-alkylisothiocyanates made by various procedures. Kharasch et al., J. Am. Chem. Soc., 59, 1580 (1937), reacted isobutylene and thiocyanic acid to obtain a mixture of t-butylisothiocyanate and t-butylthiocyanate. Schmidt, et al., ANN., 568, 192 (1950), reacted ammonium thiocyanate and t-butylchloride to obtain t-butylisothiocyanate. Bortnick et al., J. Am. Chem. Soc., 78, 4358 (1956), employed thermal and acid catalysis to effect cleavage of di-t-octylthiourea, and alternatively used ethylchloroformate to decompose the dithiocarbamate from t-octyl amine, so as to obtain t-octylisothiocyanate. Craig et al., in U.S. Patent 2,689,255 (1954) and in J. Am. Chem. Soc., 78, 4965 (1956), disclose a reaction involving diisobutylene, sodium thiocyanate, and sulfuric acid to prepare t-octylisothiocyanate. Kawaoka, J. Soc. Chem. Ind. Japan, 43, No. 2, suppl. binding 53, 151 (1940), reacted methylene aniline and sulfur at elevated temperatures in an autoclave to obtain phenylisothiocyanate. The present invention possesses advantages over all these earlier methods.

The t-alkylisothiocyanates may be represented by the following structural formula:

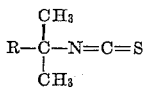

The value for R in the compounds known to the prior art as described above is a maximum of 5 or 6 carbon atoms. The present invention, in addition to making it possible to obtain those same compounds in economically suitable yields, also provides a method for preparing novel high molecular weight t-alkylisothiocyanates in which R has a value of from 8 to 19 carbon atoms.

There are three alternative methods for practicing the present invention:

PROCEDURE A

One very simple and practical method typically involves the reaction of a t-alkylazomethine with an excess of molten sulfur to form the corresponding t-alkylisothiocyanate. This reaction may be represented as follows:

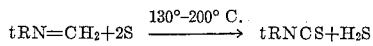

where R=4–22 carbon atoms. The reaction may be carried out quite simply by mixing the required amounts of reactants and heating until an exothermic reaction occurs. The product is isolated by distillation after filtration of any unreacted sulfur. Using this procedure, yields of approximately 30 percent have been obtained.

PROCEDURE B

The preferred method, which gives yields of 60–70 percent, consists in slowly adding to an excess of molten sulfur a mixture of the t-alkylazomethine and at least 0.5 equivalent(s) of the corresponding t-alkylamine. This method permits the reaction to proceed smoothly without the uncontrollable violent exotherms obtained if the reaction is carried out by simply heating a mixture of the reactants at atmospheric pressure. Because of this fact, no pressure vessels are required. The sulfur is made molten by heating it to between 150° and 200° C. before commencing to add the amine and the azomethine. The addition is then carried out at 180°–200° C., or lower if the boiling point of the particular amine which is used causes the reaction temperature to fall during the addition.

PROCEDURE C

This alternative method, which also is quite effective, consists in slowly adding the t-alkylazomethine to a mixture of excess sulfur and at least 0.5 equivalent(s) of the corresponding t-alkylamine at 200° C. or less. The temperature should be at reflux if the mixture refluxes below 200° C., or at 180°–200° C. if the particular amine employed is of a higher boiling variety. The yields obtained by this method vary from about 10 percent to about 65 percent depending on the ratio of the reactants, temperature, and length of addition time.

In each of the three procedures described above, an exothermic reaction takes place within varying times from one minute on up depending upon the reactants involved, the temperature of the mixture, etc., although it usually averages about 10 minutes. The best results are obtained if the method is carried out in no more than one to one-and-a-half hours after this exothermic reaction takes place. If the mixture is held at elevated temperatures for much longer than that time, the yield generally drops off.

A surprising aspect of Procedures B and C is the fact that the products are predominantly the t-alkylisothiocyanates and not di-t-alkylthioureas. The latter compounds normally would be expected to be obtained since they are readily formed by the reaction of t-alkylisothiocyanates and t-alkyl amines.

In each of the three procedures described above, the reaction may be run with at least 2 moles of sulfur for each mole of the t-alkylazomethine, although an excess of from 4 to 15 moles of sulfur to 1 mole of the azomethine is preferred. In Procedures B and C the ratio of t-alkylamine to t-alkylisothiocyanate may range from 0.5–8.0 of the amine to 1.0 of the azomethine, although a 1:1 ratio is usually to be preferred. No other solvents are required for the reaction, but others such as pyridine may be used, and the t-alkylamine can be recovered during distillation of the product.

The products which are obtainable by the present invention, in accordance with the methods described generally above and more specifically in the examples which follow, have been found by standard analytical procedures to contain no thiocyanates or other contaminants such as amidines or benzothiozoles. The t-alkylisothiocyanates produced by the present invention, and their thiourea derivatives, are valuable as chemical inhibitors. The t-alkylisothiocyanates react with proteinaceous materials such as wool and casein to decrease their water sensitivity. The higher molecular weight compounds, namely, those in which R in the structural formula set forth above has a value of at least 11 carbon atoms, are of particular value because of their better oil-solubility and performance as an oxidation-corrosion inhibitor. It should be understood that the present invention is well represented, but in no way limited, by the following examples.

*Preparation of t-octylisothiocyanate*

EXAMPLE 1 (BY PROCEDURE A)

A mixture of 28.2 parts of t-octylazomethine and 12.8 parts of sulfur was stirred and heated to 140° C. An exothermic reaction occurred with the evolution of hydrogen sulfide. The mixture was cooled, diluted with toluene, heptane, and isopropanol, and filtered. The filtrate was distilled to give 11 parts of t-octylisothiocyanate, B.P. 52°–54° C./1.0 mm. This was redistilled and a center fraction, B.P. 44°–45° C./0.5 mm., was taken. It contained by analysis 63.20 percent of carbon, 9.84 percent of hydrogen, 8.21 percent of nitrogen, and 18.48 percent of sulfur. Corresponding theoretical values are 63.10, 10.01, 8.18, and 18.71 percent respectively. It reacted with t-octylamine to give di-t-octylthiourea, M.P. 109°–111° C.

EXAMPLE 2 (BY PROCEDURE B)

To 48 parts of stirred sulfur at 165° C. was added dropwise during 45 minutes a mixture of 28.2 parts of t-octylazomethine and 25.8 parts of t-octylamine while the temperature was maintained at 145°–155° C. The mixture was then heated to 163° C. during another 5 minutes, cooled, diluted with heptane, chilled, and filtered free of 35 parts of sulfur. The filtrate was distilled and the distillate redistilled to give 21 parts of t-octylisothiocyanate which came over at 44°–46° C. and 0.5 mm.

EXAMPLE 3 (BY PROCEDURE C)

A mixture of 100 parts of t-octylamine and 14.3 parts of sulfur was stirred and heated to reflux. There was added dropwise during 45 minutes 14.3 parts of t-octylazomethine while hydrogen sulfide was evolved. The mixture was cooled and filtered. The filtrate was distilled and the distillate was redistilled to give 11 parts of t-octylisothiocyanate which came over at 45°–50° C. and 0.5 mm.

*Preparation of higher t-alkylisothiocyanates*

In the following three examples, the designation "APA" has been used to represent a t-alkyl primary amine which has the following structure:

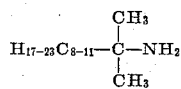

EXAMPLE 4 (BY PROCEDURE A)

A mixture of 12.8 parts of sulfur and 40.8 parts of APA-azomethine was stirred and heated to 160° C. An exothermic reaction occurred with the evolution of hydrogen sulfide. The mixture was cooled, diluted with heptane, and filtered. The filtrate was distilled and the distillate (12 parts) was redistilled to yield 10 parts of APA-isothiocyanate which came over at 87°–92° C. and 0.5 mm. It contained by analysis 69.35 percent of carbon, 10.97 percent of hydrogen, 6.23 percent of nitrogen, and 13.39 percent of sulfur. Corresponding theoretical values are 67.54–70.52, 10.86–11.44, 5.49–6.57, and 12.55–15.03 percent respectively.

EXAMPLE 5 (BY PROCEDURE B)

To 48 parts of stirred sulfur at 180°–190° C. was added dropwise during 15 minutes a mixture of 22 parts of APA-azomethine and 21 parts of APA while hydrogen sulfide was evolved. The mixture was heated to 200° C. during 5 minutes, cooled rapidly, diluted with heptane, and filtered free of 41 parts of sulfur. The filtrate was distilled to give 24 parts of basic material (mostly APA) which came over at 30°–80° C. and 0.35 mm. and 17 parts of APA-isothiocyanate which came over at 80°–90° C. and 0.35 mm. There was 5 parts of residue. The product was redistilled and there was obtained a center fraction of about 14 parts which came over at 80°–90° C. and 0.35 mm. Its refractive index at 26° C. was 1.4850 and it contained by analysis 69.44 percent of carbon, 11.35 percent of hydrogen, 6.20 percent of nitrogen, and 14.19 percent of sulfur. Corresponding theoretical values for APA-isothiocyanate are 67.54–70.52, 10.86–11.44, 5.49–6.57, and 12.55–15.03 percent respectively.

This procedure was repeated using twice as many parts of APA in the addition mixture and the yield of APA-isothiocyanate was essentially the same. When Procedure B was repeated using sulfur: APA-azomethine : APA mole ratios of 1.5:0.2:0.1 and 1.5:0.2:0.2, the yield of APA-isothiocyanate was in each case lower by about 8 percent.

EXAMPLE 6 (BY PROCEDURE C)

A mixture of 100 parts of APA and 12.8 parts of sulfur was stirred and heated to 185° C. There was added dropwise during 45 minutes 20.4 parts of APA-azomethine while the temperature was maintained at 185°–195° C. and hydrogen sulfide was evolved. The mixture was cooled, diluted with heptane, and filtered. The filtrate was distilled and there was collected, after a forerun of 100 parts, 17 parts of crude APA-isothiocyanate which came over at 80°–120° C. and 0.4 mm. This was redistilled and a center fraction of 11 parts of APA-isothiocyanate which came over at 80°–85° C. and 0.4 mm. was collected. It contained by analysis 6.06 percent of nitrogen. The theoretical value is 5.49–6.57.

When Procedure C was repeated using about four times as many parts of sulfur and no APA there was obtained only 10 parts of once-distilled APA-isothiocyanate.

EXAMPLE 7 (BY PROCEDURE B)

In the following example, the designation "PA" has been used to represent a t-alkyl primary amine which has the following structure:

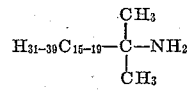

To 48 parts of stirred sulfur at 175°–185° C. was added dropwise during 10 minutes a mixture of 33 parts of PA-azomethine and 30 parts of PA while hydrogen sulfide was evolved. The mixture was stirred for 1 minute at 180° C., cooled rapidly, diluted with heptane, and filtered free of 42 parts of sulfur. The filtrate was distilled to give 16 parts of PA-isothiocyanate which came over at 115°–135° C. and 0.3 mm. and was contaminated by some PA, as evidenced by its neutral equivalent of 1900. (Theory for PA is about 300.)

I claim:
1. The method of preparing a tert.-alkylisothiocyanate which comprises mixing at least two moles of molten sulfur with each mole of a tert.-alkylazomethine and heating the reactants together under atmospheric pressure at a temperature of from about 130° to about 200° C. until an exothermic reaction occurs, and for no more than about 90 minutes thereafter.
2. The method of claim 1 in which from 4 to 15 moles of sulfur are employed.
3. The method of preparing a tert.-alkylisothiocyanate which comprises slowly adding to molten sulfur a mixture consisting of a tert.-alkylazomethine and at least 0.5 equivalent of the corresponding tert.-alkylamine, the entire mixture being held at a temperature of from about 130° to about 200° C. under atmospheric pressure for no more than about 90 minutes thereafter, there being at least two moles of sulfur for each mole of the mixture.
4. The method of claim 3 in which from 4 to 15 moles of sulfur are employed.
5. The method of claim 3 in which the ratio of tert.-alkylamine to tert.-alkylazomethine ranges from 0.5:1 to 8:1.

6. The method of preparing a tert.-alkylisothiocyanate which comprises slowly adding a tert.-alkylazomethine to a mixture of molten sulfur and at least 0.5 equivalent of the tert.-alkylamine which corresponds to the tert.-alkylazomethine, the said mixture being held at a temperature of from about 130° to about 200° C., under atmospheric pressure during the addition and for no more than about 90 minutes thereafter, there being at least two moles of the sulfur to each mole of the tert.-alkylazomethine.

7. The method of claim 6 in which from 4 to 15 moles of sulfur are employed.

8. The method of claim 6 in which the ratio of tert.-alkylamine to tert.-alkylazomethine ranges from 0.5:1 to 8:1.

9. The preparation of

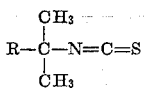

where R is 5–19 carbon atoms, by the method of claim 1 in which the tert.-alkylazomethine is tRN=CH$_2$, where R is 8–22 carbon atoms.

10. The preparation of

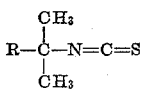

where R is 5–19 carbon atoms, by the method of claim 3 in which the tert.-alkylazomethine is tRN=CH$_2$, where R is 8–22 carbon atoms, and the tert.-alkylamine is

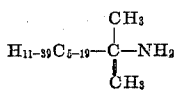

11. The preparation of

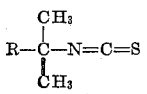

where R is 5–19 carbon atoms, by the method of claim 6 in which the tert.-alkylazomethine is tRN=CH$_2$, where R is 8–22 carbon atoms, and the tert.-alkylamine is

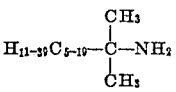

12. The preparation of tert.-octylisothiocyanate by the method of claim 1 in which the tert.-alkylazomethine is tert.-octylazomethine.

13. The preparation of tert.-octylisothiocyanate by the method of claim 3 in which the tert.-alkylazomethine is tert.-octylazomethine and the tert.-alkylamine is tert.-octylamine.

14. The preparation of tert.-octylisothiocyanate by the method of claim 6 in which the tert.-alkylazomethine is tert.-octylazomethine and the tert.-alkylamine is tert.-octylamine.

15. t-RN=C=S where R is an alkyl group of the structure

wherein $R_1$, $R_2$, and $R_3$ are hydrocarbon radicals where the sum of the carbon and hydrogen atoms is $C_{10-21}H_{23-45}$.

References Cited in the file of this patent

UNITED STATES PATENTS 2,689,255  Craig et al. _____ Sept. 14, 1954

OTHER REFERENCES

Kharasch et al.: J.A.C.S., vol. 59, page 1580, 1937.
Degering: "An Outline of Organic Nitrogen Compounds," 1945, page 548 (section 1750).